United States Patent
Baudino et al.

(10) Patent No.: US 6,937,856 B2
(45) Date of Patent: Aug. 30, 2005

(54) METHOD FOR PUSH-TO-LISTEN REMOTE MONITORING

(75) Inventors: Daniel A. Baudino, Lake Worth, FL (US); Deepak P. Ahya, Plantation, FL (US)

(73) Assignee: Motorola, Inc., Schaumburg, IL (US)

(*) Notice: Subject to any disclaimer, the term of this patent is extended or adjusted under 35 U.S.C. 154(b) by 45 days.

(21) Appl. No.: 10/657,305

(22) Filed: Sep. 8, 2003

(65) Prior Publication Data

US 2005/0054360 A1 Mar. 10, 2005

(51) Int. Cl.[7] .............................................. H04M 3/00
(52) U.S. Cl. .................. 455/418; 455/419; 455/420; 455/517; 455/518; 455/519; 370/276; 370/277; 370/328; 340/825.24; 340/825.25; 340/825.69
(58) Field of Search ............................... 455/418–420, 455/517–521, 9–11.1, 67.1–67.4, 67.11, 67.12; 340/825.24, 825.25, 825.69; 370/328, 276–277

(56) References Cited

U.S. PATENT DOCUMENTS

| | | | | |
|---|---|---|---|---|
| 5,640,147 A | * | 6/1997 | Chek et al. ............... 340/573.4 |
| 6,449,491 B1 | * | 9/2002 | Dailey ........................ 455/518 |
| 6,477,150 B1 | * | 11/2002 | Maggenti et al. ........... 370/312 |
| 6,751,468 B1 | * | 6/2004 | Heubel et al. .............. 455/518 |
| 6,759,961 B2 | * | 7/2004 | Fitzgerald et al. ........ 340/573.1 |
| 2003/0096580 A1 | | 5/2003 | Kaplan | |
| 2003/0139175 A1 | * | 7/2003 | Kim ........................... 455/419 |

* cited by examiner

*Primary Examiner*—Temica M. Beamer
*Assistant Examiner*—Anthony S. Addy

(57) ABSTRACT

A method of operating a wireless communication system (101) including initiating (S402) a call from a first communications unit (120) to a second communications unit (130), embedding (S404) a push-to-listen control protocol configuration in a data packet (140) responsive to the call initiation, transmitting (S406) the data packet (140) from the first communications unit (120) to the second communications unit (130), configuring (S412) the second communications unit (130) based on the push-to-listen control protocol configuration and transmitting (S418) an automatic reconnect from the second communications unit (130) to the first communications unit (120) responsive to configuration of the second communications unit (130).

34 Claims, 7 Drawing Sheets

METHOD FOR PUSH-TO-LISTEN REMOTE MONITORING

The present invention generally relates to push-to-listen monitoring via wireless communication system. More specifically the present invention relates to monitoring without a need for the monitored to push any buttons.

BACKGROUND

FIG. 1 is a block diagram illustrating a conventional wireless communication system 100. The exemplary wireless communication system of FIG. 1 comprises a wireless service provider 105, a wireless network 107 and wireless devices 110 through 115. The wireless network includes a plurality of base stations and cell towers, which are shown as a fixed network element (FNE) 108. The wireless network 107 and the FNE 108 can support both cellular telephone and dispatch service. The wireless service provider 105 is a first-generation analog mobile phone service (1G), a second-generation (2G) digital mobile phone service (including interim 2.5G and 2.75G networks) or a third-generation (3G) Internet-capable mobile phone service. The exemplary wireless network 107 is a mobile phone network, a mobile text messaging device network, a pager network, or the like. In one example, the communications standard of the wireless network 107 of FIG. 1 is Code Division Multiple Access (CDMA), Time Division Multiple Access (TDMA), Global System for Mobile Communications (GSM), General Packet Radio Service (GPRS), Frequency Division Multiple Access (FDMA) or the like. The operation and configuration of the wireless network 107 and the FNE 108 is well known, and an in-depth discussion is not warranted.

The wireless network 107 supports any number of wireless devices 110 to 115, which are mobile phones, text messaging devices, handheld computers, pagers, beepers, or the like.

It is desirable to have a method of communicating with persons who are incapable of pushing a button, in particular for a monitoring situation where a person wants to be able to call an elderly parent or a small child. A small child does not have the skill to push the correct buttons to receive or send a phone call. An elderly person may be incapable of pushing buttons or may find it difficult or painful to push buttons on a telephone. An invalid may be incapacitated and unable to use their hands well enough to push a button.

SUMMARY OF THE INVENTION

One aspect of the present invention provides a method of operating a wireless communication system comprising initiating a call from a first communications unit to a second communications unit and embedding a push-to-listen control protocol configuration in a data packet responsive to the call initiation. The method additionally comprises transmitting the data packet from the first communications unit to the second communications unit and configuring the second communications unit based on the push-to-listen control protocol configuration.

Another aspect of the present invention provides a wireless communication system, which comprises means to initiate a call from a first communications unit to a second communications unit and means to embed a push-to-listen control protocol configuration in a data packet responsive to the call initiation. The wireless communication system also comprises means to transmit the data packet from the first communications unit to the second communications unit and means to configure the second communications unit based on the push-to-listen control protocol configuration.

A third aspect of this invention provides a computer usable medium storing a computer program comprising computer readable code for initiating a call from a first communications unit to a second communications unit and for embedding a push-to-listen control protocol configuration in a data packet responsive to the call initiation. The computer usable medium storing a computer program comprising computer readable code also provides computer readable code for transmitting the data packet from the first communications unit to the second communications unit and for configuring the second communications unit based on the push-to-listen control protocol configuration.

The forgoing device and other devices as well as features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

The present invention is illustrated by way of example and not limitation in the accompanying figures, in which like references indicate similar elements, and in which.

DETAILED DESCRIPTION OF THE DRAWINGS

Figure 1:
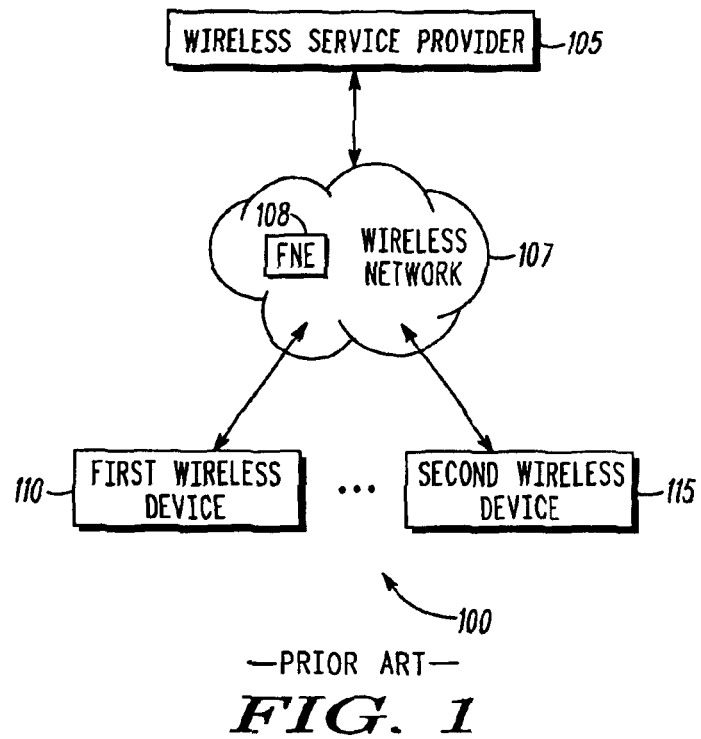
FIG. 1 illustrates a block diagram illustrating a conventional wireless communication system.
Figure 2:
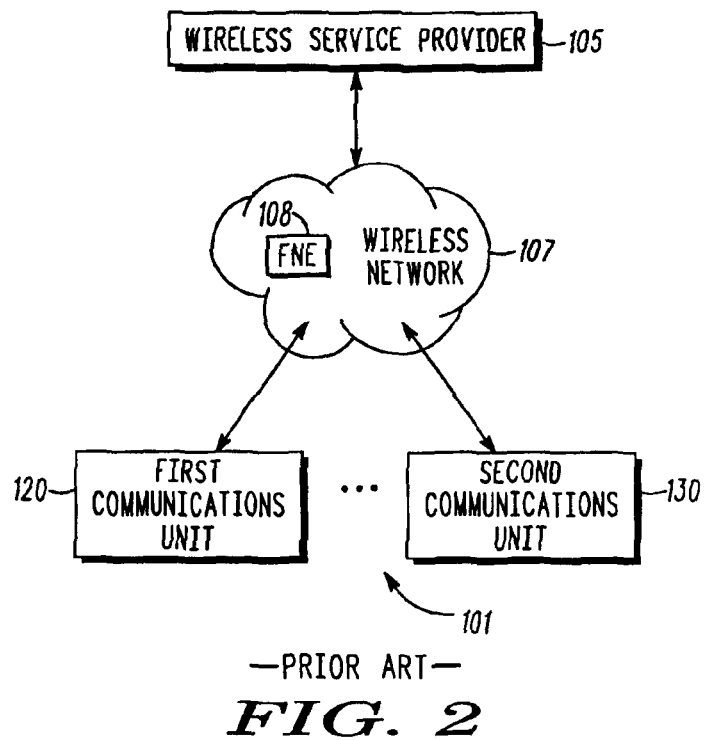
FIG. 2 is a block diagram illustrating a push-to-listen system in accordance with one embodiment of the present invention.

FIG. 2 is a block diagram illustrating a push-to-listen wireless communication system 101 in accordance with one embodiment of the present invention. The exemplary push-to-listen wireless communication system 101 comprises the wireless service provider 105, the wireless network 107 and at least a wireless first communications unit 120 and wireless second communications unit 130. The wireless network includes a plurality of base stations and cell towers, which are shown as a fixed network element (FNE) 108. The wireless service provider 105 and the wireless network 107 provide the same functionality as described in FIG. 1.

Figure 3:
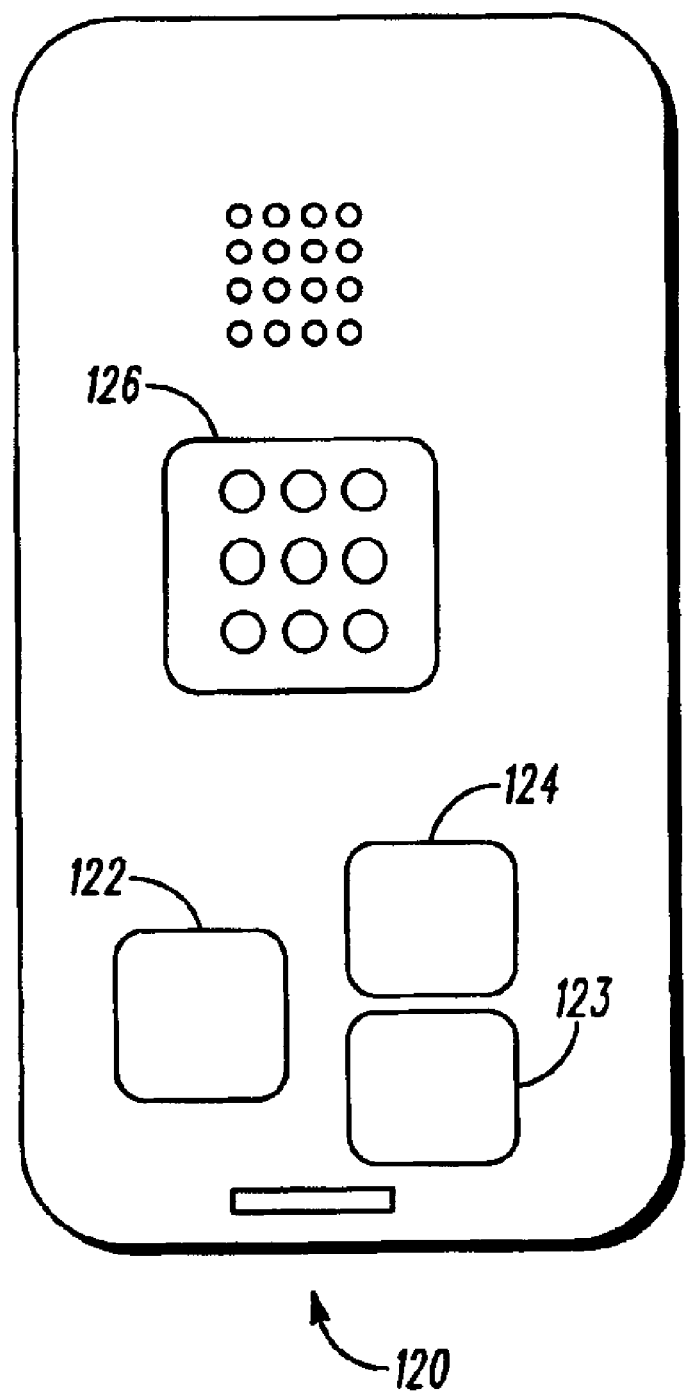
FIG. 3 is a block diagram of a communications unit in accordance with one embodiment of the present invention.

FIG. 3 illustrates a first communications unit 120 in accordance with one aspect of the invention. In one embodiment, the first communications unit comprises at least a push-to-listen button 122, operable to initiate a push-to-listen call, a scroll down button 123, an up scroll key 124 and a keypad 126 operable to control some of the functionality of the first and second communications units 120 and 130. In another embodiment, the second communications unit 130 is identical to the first communications unit 120. In another embodiment, the first and second communications units 120, 130 are not identical, but both the first and second communications units 120, 130 comprise push-to-listen capability as disclosed herein. In yet another embodiment, the second communications unit 130 may not comprise a scroll button or a push-to-listen button, and in such an embodiment, the second communications unit may solely function as a push-to-listen device. The push-to-listen button 122 on the first communications unit 120 is operable to initiate a transmission over a communications channel within the wireless network 107. For example, when the user (not shown) of the first communications unit 120 presses the push-to-listen button 122, a communications channel is assigned within the wireless network 107 and the first communications unit 120 can begin transmitting a communication from the user. The first communications unit 120 and the second communications unit 130 have, in one embodiment, the capability to operate as push-to-talk communications units or as push-to-listen communications units.

When the monitor releases the push-to-listen button 122, the first communications unit 120 transmits an end-of-transmission (EOT) message over a communications channel within the wireless network 107. At this point, the first communications unit 120 is no longer transmitting over the communications channel within the wireless network 107.

The first communications unit 120 and the second communications unit 130 may have capability to operate as normal cell phones, as illustrated in FIG. 1, and to operate as a push-to-listen devices, as illustrated in FIG. 2. This combination of cell phone and push-to-talk capability hard-wired into a single wireless communication unit is known to those of ordinary skill in the art and such units are commercially available, from vendors, such as, for example, Nextel. The first communications unit 120 and the second communications unit 130 may support both cellular telephone service and push-to-listen service, although the first communications unit 120 and the second communications unit 130 are not limited in this regard. In fact, the term "communications unit" can include any telecommunications unit suitable for conducting a call, including even a fixed telecommunications device. Thus, the definition of "communications unit" comprises "land lines," push-to-talk devices, push-to-listen devices, cellular phones and any portable communications device.

The push-to-listen capability described herein functions as a monitoring and communicating system for elderly people, invalids, children, as well as others. The push-to-listen capability allows for the monitored person on the second communications unit 130 to have a conversation with the monitor on the first communications unit 120, without the monitored pushing a button or picking up the second communications unit. The monitor on the first communications unit 120 is the only person required to push buttons or pick up a communications unit for the conversation to occur.

The phrases "the monitor" and "the initiator" are used interchangeably within this document to describe the person who initiated the call and controls various parameters with button pushes during the call. Likewise, the phrases "the monitored" and "the recipient" are used interchangeably within this document to describe the person who receives a phone call and carries on a conversation with the monitor without any button pushing required.

Figure 4:
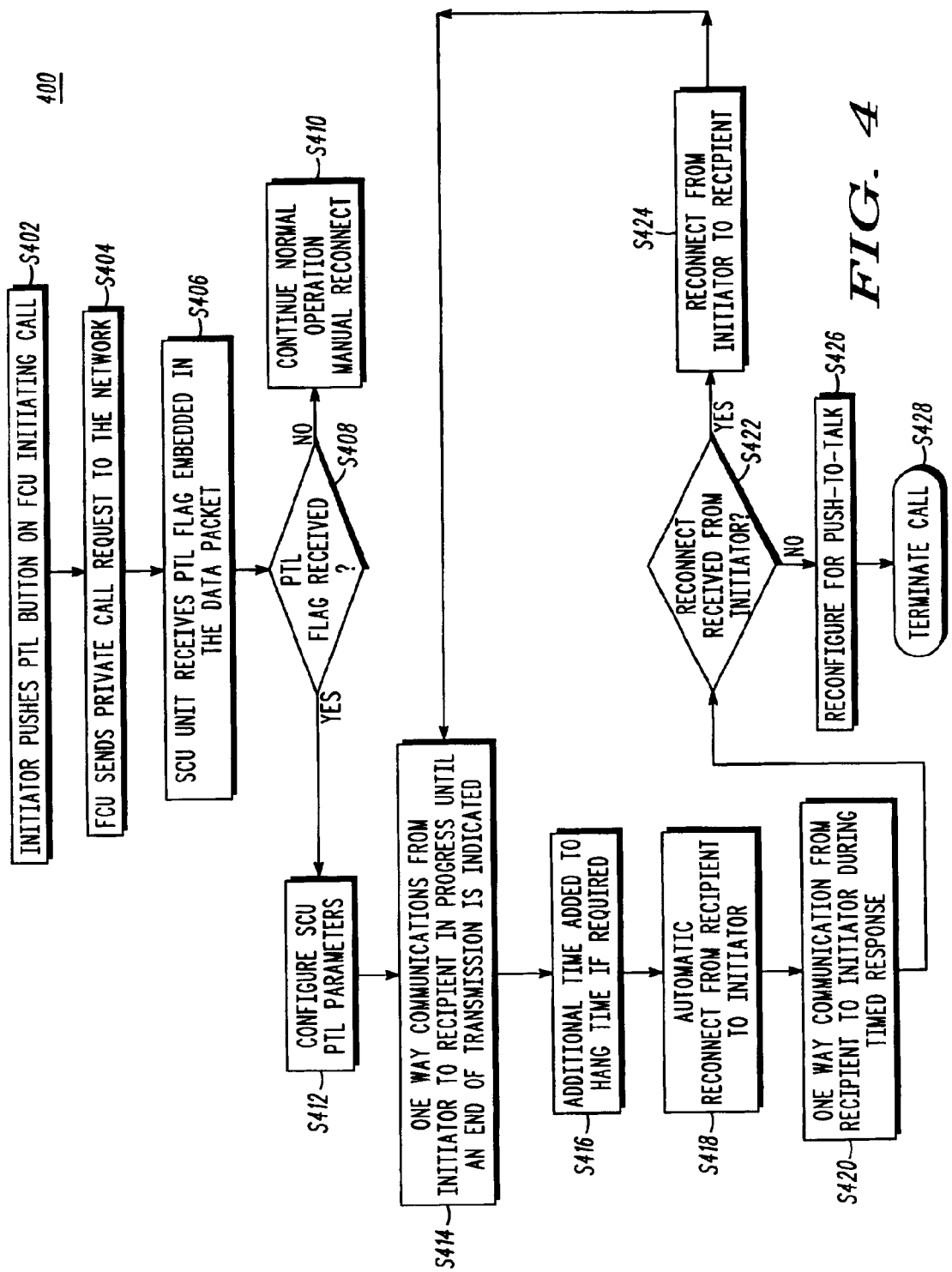
FIG. 4 is a flowchart representing operation of one embodiment of the push-to-listen system in accordance with one embodiment of the present invention.

FIG. 4 is a flowchart 400 representative of one embodiment of the push-to-listen wireless communication system 101. During stage S402, the initiator pushes the push-to-listen button (PTL) 122 on the first communications unit (FCU) 120, as illustrated in FIG. 3, to initiate a call. During stage S404, the first communications unit 120 sends a call request to the wireless network 107 with a protocol for push-to-listen embedded in the transmitted data packets in order to open a communication channel for the initiator to communicate with the recipient. The fixed network element 108 in the wireless system 107 locates the second communications unit 130 and sends the call request message to the second communications unit 130.

During stage S406 the second communications unit 130 receives the push-to-listen (PTL) flag embedded in the data packet from the fixed network element 108.

During stage S408 it is determined if a push-to-listen flag was received at the second communications unit 130. Because the push-to-listen flag was embedded in the call request received at the second communication device 130 during stage S406, the flow proceeds to stage S412. If no push-to-listen flag had been embedded in the call request received at the recipient phone during stage S406, the flow proceeds to stage S410 and the call continues with push-to-talk manual reconnect operation on the part of the person using the second communications unit 130, as is known to those of ordinary skill in the art.

During stage S412, the second communications unit 130 is configured for the default push-to-listen parameters in response to the input data packet containing the push-to-listen flag.

During stage S414, the first communications unit 120 opens a voice channel and becomes the talker. One way communication from the initiator to the recipient is in progress as the initiator speaks to the recipient while holding down the push-to-listen button 122. When the initiator releases the push-to-listen button 122, a private call end of transmission is indicated.

The private call end of transmission is transmitted from the first communications unit 120 to the fixed network element 108 of the wireless system 107. At this time, the fixed network unit 108 of the wireless system 107 provides an open channel for a reconnect to be established from the second communications unit 130 to the first communications unit 120. Hang time is the amount of time that the temporary communication channel, which is assigned to the communication units 120 and 130 when they are not transmitting, is held open.

During stage S416, additional time is added to the conventional hang time, if the push-to-listen embedded protocol indicated an additional hang time as a default parameter. Additional delay time may be desired if the monitor operating the first communications unit 120 anticipates that the monitored may be delayed in getting to a position to verbally respond to a push-to-listen call from the monitor. This provides additional time for the recipient to respond. Additional hang time is a preset time, which is reconfigurable during a push-to-listen call, as will be described in FIGS. 11 and 12. Once the monitored is in a position to talk with the monitor, the monitor may desire to remove or decrease the additional hang time during the call. The additional hang time is also configurable before or after the call is made.

The push to listen protocol provides an automatic reconnect from the second communications unit 130 to the first communications unit 120. During stage S418, the automatic reconnect from recipient to initiator is established. The second communications unit 130 sends a reconnect request to the wireless network 107 in order to re-open the communication channel for the initiator to communicate with the recipient. The fixed network element 108 re-opens the communication channel, and the monitored can speak to the monitor.

During stage S420, one-way communication from the recipient to the initiator is established for a set timed response. The push-to-listen protocol has embedded a preset timed response time for the one-way communication of stage S420 to take place. During this time, the recipient speaks to the call initiator without having to hold or push down the push-to-listen button 122. This preset timed response time is configurable during the call, as will be described in FIGS. 9 and 10. The timed response time is also configurable before or after the call is made. The timed response may be any time such as, for example, 15 seconds, 40 seconds or 60 seconds. The amount of timed response is established by the monitor from the first communications unit 120.

It is also during stage S420 that an initiator may terminate the call, when the conversation between the initiator and the recipient is concluded. After the automatic reconnect of stage S418 the initiator can abort the call by pressing a termination button (not shown) on the first communications unit 120. In one embodiment of the invention, the termination button is the push-to-listen button 122. In another embodiment of the invention, a button separate from the push-to-listen button 122 is provided as a dedicated termination button.

Once the timed response time has elapsed, the fixed network element 108 of the wireless system 107 provides an open channel for a reconnect to be established from the first communications unit 120 to the second communications unit 130. Stage S422 occurs during this second hang time. During stage S422, the wireless system 107 determines if a reconnect is sent from the initiator. It is unnecessary to modify the second hang time with the push-to-listen protocol.

The initiator can also terminate the conversation during stage S422 by not sending a reconnect signal; that is, the initiator can terminate the conversation by not pushing the push-to-listen button 122.

If a reconnect is received during stage S422, such as if the initiator has pushed the push-to-listen button 122 again, the flow proceeds to stage S424. During stage S424, the initiator is reconnected to the recipient, without the recipient ever having pushed any buttons on the second communications unit 130. The flow then proceeds to stage S414, and the initiator can speak to the recipient as previously described.

The flow from S408 through S422 to S424 will continue in this manner until there is no reconnect received during stage S422 and then the flow proceeds to stage S426. During stage S426, the second communications unit 130 is reconfigured for push-to-talk operation. The call is terminated during S428. If the call follows the flow through stage S422 to stage S428, the initiator has chosen to end the call. In this case, the call is terminated when the initiator does not press the push-to-listen button 122 on the first communications unit 120 during stage S422 after the timed response of stage S420 expires or after the initiator presses the termination button.

The parameters of the configuration of the second communications unit 130 may be modified at any point during the communication flow as will be described in detail in FIGS. 9–14. For example, the speaker gain of the second communications unit 130 may be modified at any step in the method outlined above. Other parameters may be similarly modified at any step in the method.

Although the operation of the wireless communication system 101 is described in FIG. 4 as half-duplex, this invention is not limited to half-duplex but can be practiced in systems, such as, for example, full duplex or half duplex that do not rely upon the wireless network 107 communication system.

Figure 5:
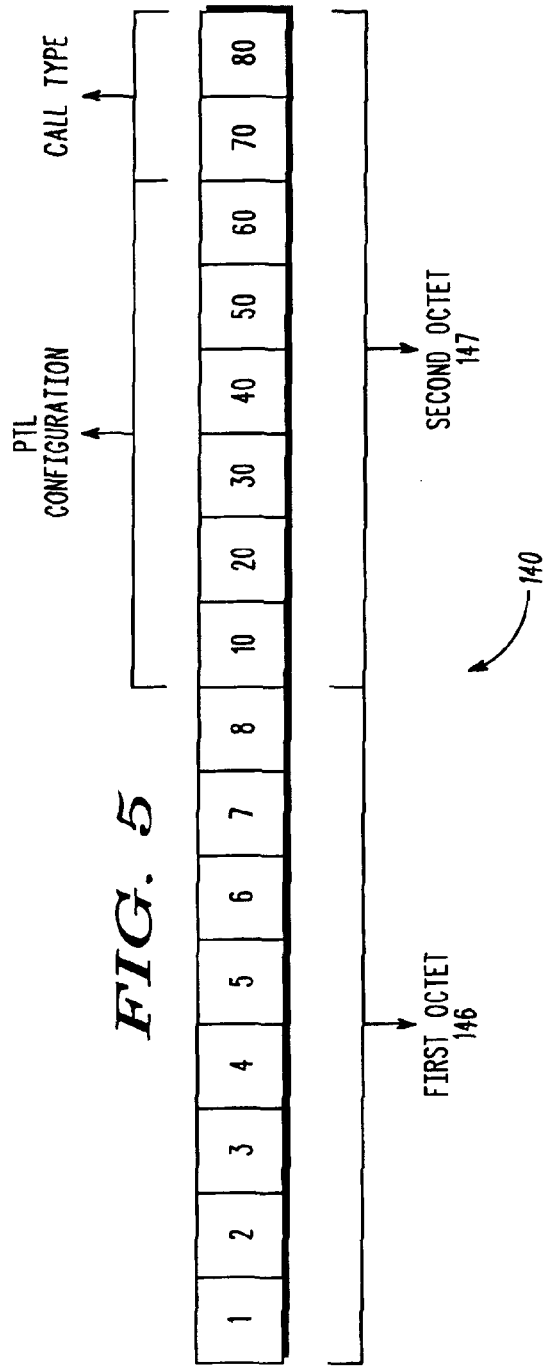
FIG. 5 is a block diagram of a private call information element to initiate a push-to-listen call in accordance with one embodiment of the present invention.

FIG. 5 is a block diagram illustrating a private call information element 140, which is part of the packet transmitted to initiate a push-to-listen call according to one embodiment of the present invention. It should be noted that for clarity and brevity purposes, this specification describes a 16-bit information packet. However, the invention is in no way limited to 16-bit information packets and the invention may be practiced with an information packet with more or less bits. The size of the information packet is a matter of design choice, and the invention is in no way limited by the number of bits within the information packet. When the first communications unit 120 transmits a call request to the wireless network 107, the information element 140 is embedded within the request. The information element 140 consists of 16 bits. The first octet 146 comprises the first 8 bits of the information element 140 (1, 2, 3, 4, 5, 6, 7, 8), which contain the elements required to set up the connection through the wireless network 107. The second octet 147 of the information element 140 comprises the second 8 bits (10, 20, 30, 40, 50, 60, 70, 80). The bits in the second octet are set to configure a second communications unit 130 for the push-to-listen capability. Bits 70 and 80 comprise a call type indicator, which describes the type of the call that is being requested in the private call. These bits will provide information about the type of call that is being requested in the private call sent by the initiator. Bit 60 indicates if the call is a push-to-talk or a push-to-listen call. When bit 60 is set to one, the push-to-listen flag will be received at the second communications unit 130, as described during stage S406 in FIG. 4. The conversation between the initiator and the recipient will take place with no button pushing required of the recipient as described in FIG. 4. If bit 60 is set to zero, no push-to-listen flag is received and the recipient will need to push buttons on the second communications unit 130 to open a communication channel to talk to the initiator listening on the first communications unit 120.

Bit 50 indicates if an additional hang time is to be added to the conventional hang time at the end of transmission from the initiator (stage S416, FIG. 4) and before the automatic reconnect from the recipient (Stage S418, FIG. 4). If bit 50 is set to one, an additional hang time, which is preprogrammed into the second communications unit 130, will follow the end of transmission from the initiator during stage S146 in FIG. 4. If bit 50 is set to zero, no additional hang time will follow the end of transmission from the initiator before a reconnect request is sent from the second communications unit 130.

Bits 30 and 40 set the push-to-listen timed response, which is the time allotted for the monitored to speak to the monitor. The monitored does not need to push the push-to-listen button 122 to open the communication channel to speak to the monitor.

Bits 10 and 20 set the gain for the microphone on the second communications unit 130 and the gain on the speaker of the second communications unit 130.

Figure 6:
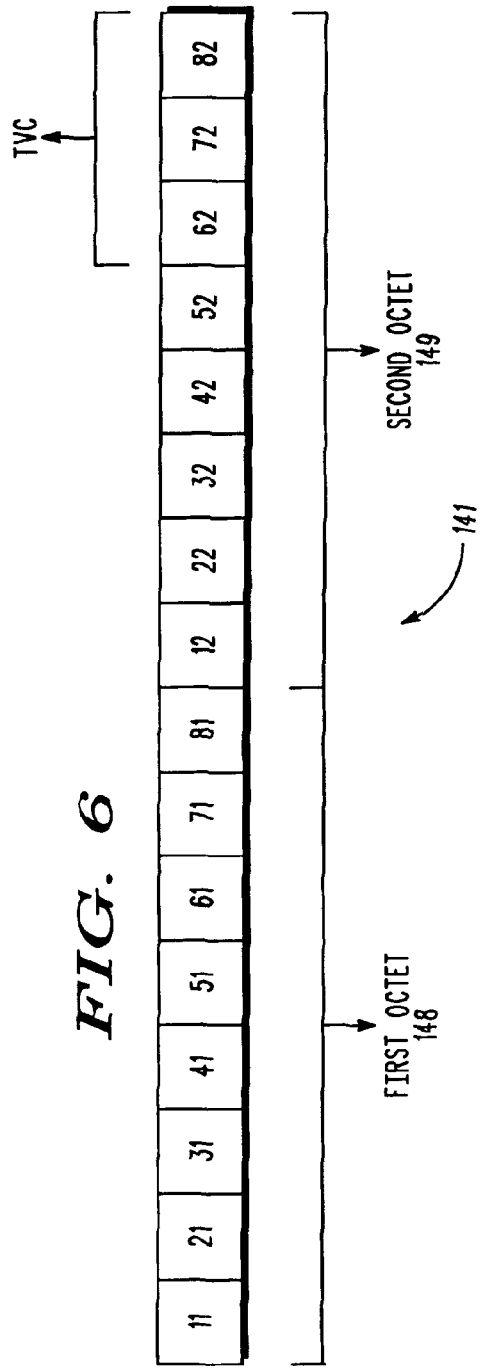
FIG. 6 is block diagram of a private call information element to modify a push-to-listen call in progress in accordance with one embodiment of the present invention.

FIG. 6 is a block diagram illustrating a private call information modifier element 141, which is embedded in the packet transmitted during a push-to-listen call according to one embodiment of the present invention. Information modifier element 141 is used to modify the second communications unit 130 while a call is in progress, while information element 140 is used to establish an open communication channel in the wireless network 107.

The information modifier element 141 consists of 16 bits. The first octet 148 comprises the first 8 bits of the information modifier element 141 (11, 21, 31, 41, 51, 61, 71, 81). The second octet 149 of the information element 141 comprises the second 8 bits (12, 22, 32, 42, 52, 62, 72, 82). The bits in the second octet 149 contain the elements required to modify some or all of the push-to-listen configuration parameters at the second communications unit 130.

Bits 62, 72 and 82 of the second octet 149 of the information element 141 comprise, in one example, a standard twelve-to-one version (TVC) compression ratio. Other embodiments of the invention comprise other compression ratios, as are known and understood by those of ordinary skill in the art.

Bit 52 in the information modifier element 141 is used to modify the additional hang time value in the push-to-listen communication system 101 by changing the amount of delay between receiving the end of transmission sent from the initiator and the automatic reconnect from the second communications unit 130. A table is preprogrammed in the second communications unit 130 to reconfigure the second communications unit 130 based on receiving a one or a zero in bit 52 in the information modifier element 141. The additional hang time value may be modified when the push-to-listen call is in progress or it may be modified by first communications unit 120 before or after the call is made.

Bits 32 and 42 in the information modifier element 141 are used to alter the push-to-listen timed response, which is the time allotted during which words spoken by the monitored will be heard by the monitor. A table is preprogrammed in the second communications unit 130 to reconfigure the second communications unit 130 based on receiving a one or zero in bits 32 and 42 in the information modifier element 141. The push-to-listen timed response may be modified when the push-to-listen call is in progress or it may be modified by first communications unit 120 before or after the call is made.

Bits 12 and 22 set the gain for the microphone on the second communications unit 130 and the gain on the speaker of the second communications unit 130. A table is preprogrammed in the second communications unit 130 to reconfigure the second communications unit 130 based on receiving ones or zeros in bits 12 and 22 in the information modifier element 141. The gain for the microphone on the second communications unit 130 and/or the gain on the speaker of the second communications unit 130 may be modified when the call is in progress. Alternately, the gain for the microphone on the second communications unit 130 and/or the gain on the speaker of the second communications unit 130 may be modified by first communications unit 120 before or after the call is made. An increase in the speaker gain is used by the monitor when, for example, the monitored does not respond to the initial call from the monitor. For example, if the monitored is asleep and the monitor wishes to arouse the monitored, a speaker gain increase is used. In another example, if the monitored is speaking too softly or is too far away from the microphone for the monitor to hear, the monitor increases the microphone gain to be able to hear the monitored.

Lookup tables are embedded in the communications units to establish the parameters, either as default parameters or as the modified parameters. Modifications to the parameters are achieved with a series of keystrokes on buttons 122, 123 and 124 and/or the keypad 126 on the first communications unit 120 on the first communications unit 120 by the initiator.

Figure 7:
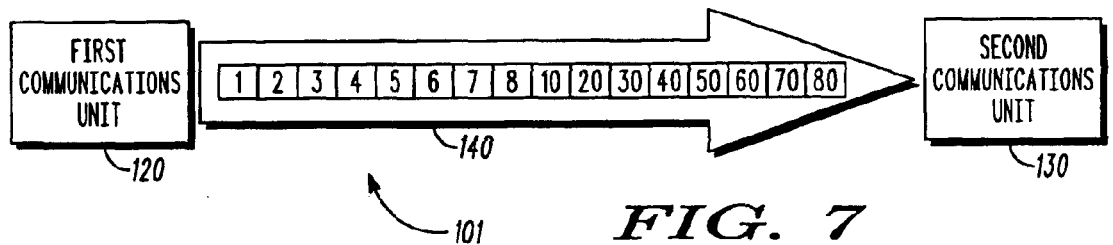
FIG. 7 is a block diagram illustrating transmission of a packet from a monitoring device to a monitored device to initiate a push-to-listen call in accordance with one embodiment of the present invention.

FIG. 7 illustrates a block diagram of wireless communication system 101 during transmission of an information element 140 from a first communications unit 120 to a second communications unit 130 configured with bits 1–8 and 10–80 to establish a push-to-listen call. For purposes of clarity the wireless network 107 interaction with the first and second communications units 120 and 130 to open and maintain the communication channel between the first communications unit 120 and the second communications unit 130 is not included in the discussion of FIGS. 7–16, since that interaction has previously been described in FIG. 4.

Figure 8:
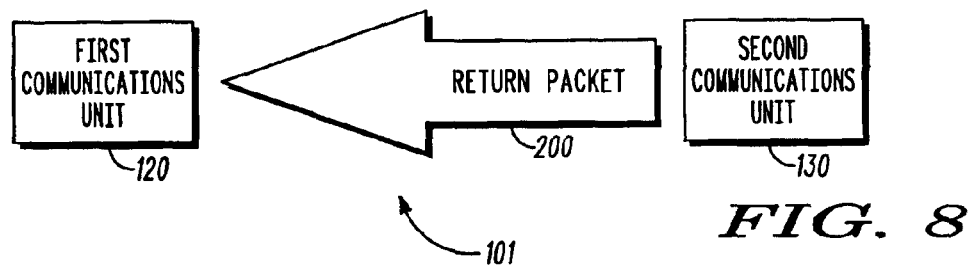
FIG. 8 is a block diagram illustrating transmission of a packet to a monitoring device from a monitored device configured for a push-to-listen call in accordance with one embodiment of the present invention.

FIG. 8 is a block diagram of wireless communication system 101 illustrating transmission of a return packet 200 from a second communications unit 130, which has been configured for a push-to-listen phone call, to a first communications unit 120 during stage S420 of FIG. 4 when the recipient speaks to the monitor. The return packet 200 is sent with no buttons pushed by the monitored on the second communications unit 130.

Figure 9:
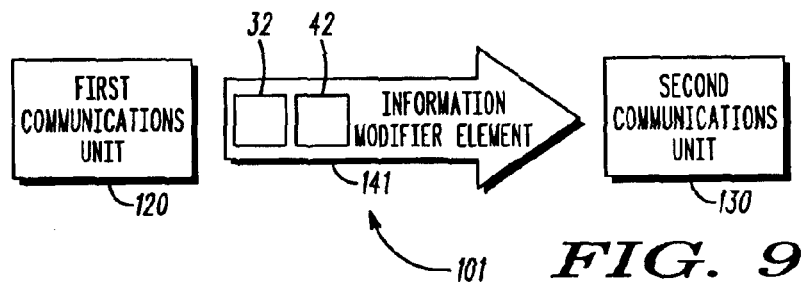
FIG. 9 is a block diagram illustrating transmission of a timed response modifying packet from a monitoring device to a monitored device in accordance with one embodiment of the present invention.

FIG. 9 illustrates a block diagram of wireless communication system 101 during transmission of an information modifier element 141 from a first communications unit 120 to a second communications unit 130. The information modifier element 141 is configured with bits 32 and 42 set to modify the push-to-listen timed response in the second communications unit 130.

Figure 10:
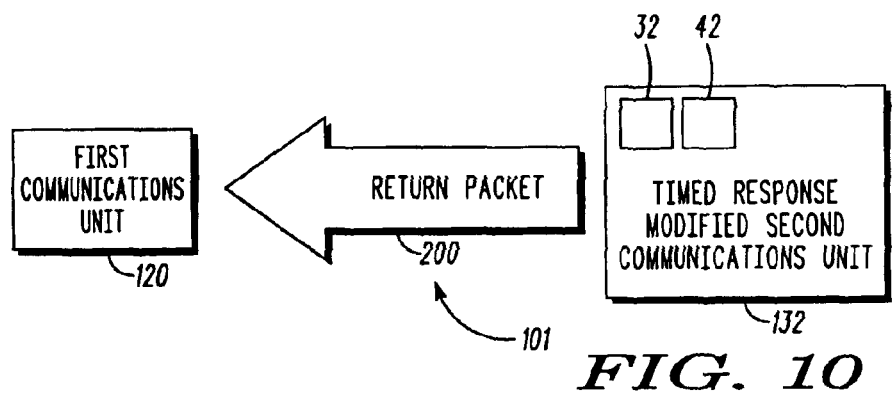
FIG. 10 is a block diagram illustrating transmission of a packet to a monitoring device from a monitored device reconfigured for a modified timed response in accordance with one embodiment of the present invention.

FIG. 10 is a block diagram of wireless communication system 101 illustrating transmission of a return packet 200 from a modified second communications unit 132 to the first communications unit 120 during stage S420 of FIG. 4 when the recipient speaks to the initiator. Upon receipt of the information modifier element 141 in FIG. 9, the second communications unit 130 is reconfigured in response to the embedded bits 32 and 42, forming a timed response modified second communications unit 132 with a new modified push-to-listen timed response.

Figure 11:
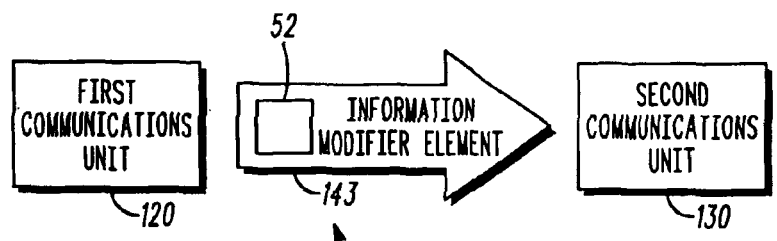
FIG. 11 is a block diagram illustrating transmission of an additional hang time modifying packet from a monitoring device to a monitored device in accordance with one embodiment of the present invention.

FIG. 11 illustrates a block diagram of wireless communication system 101 during transmission of an information modifier element 143 from a first communications unit 120 to a second communications unit 130. The information modifier element 143 is configured with bit 52 set to modify the current hang time in the second communications unit 130. This hang time is the time lapse between the received end of transmission from the first communications unit 120 and the automatic reconnect by the second communications unit 130.

Figure 12:
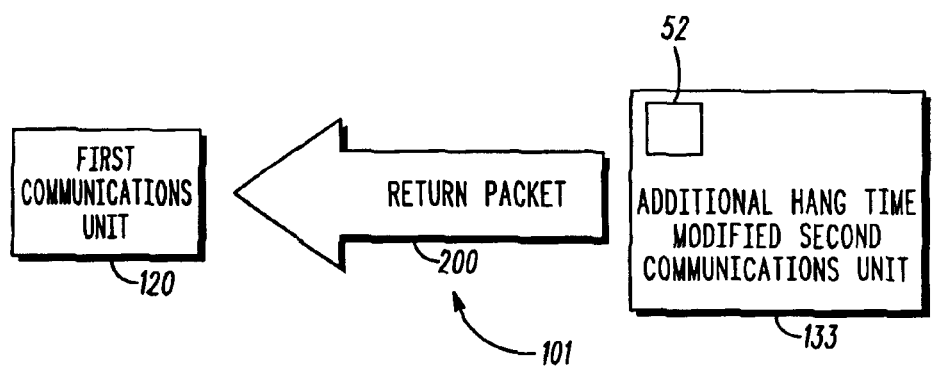
FIG. 12 is a block diagram illustrating transmission of a packet to a monitoring device from a monitored device reconfigured for a modified additional hang time in accordance with one embodiment of the present invention.

FIG. 12 is a block diagram of wireless communication system 101 illustrating transmission of a return packet 200 from a modified second communications unit 133 to the first communications unit 120 during stage S420 of FIG. 4 when the recipient speaks to the initiator. Upon receipt of the information modifier element 143 in FIG. 11, the second communications unit 130 is reconfigured in response to the embedded bit 52 forming a second communications unit 130 with a modified hang time. The modification can increase the hang time from the conventional hang time to a time above the conventional hang time. Alternately, the modification can decrease the hang time from a time above the conventional hang time to the conventional hang time. In an embodiment that does not utilize hang time, the modification of hang time may reduce the hang time to substantially zero, rendering the reconnect substantially simultaneous.

Figure 13:
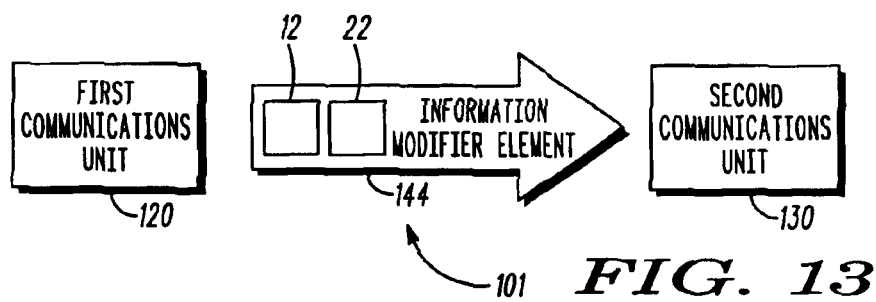
FIG. 13 is a block diagram illustrating transmission of a speaker gain modifying packet from a monitoring device to a monitored device in accordance with one embodiment of the present invention.

FIG. 13 illustrates a block diagram of wireless communication system 101 during transmission of an information modifier element 144 from a first communications unit 120 to a second communications unit 130. The information modifier element 144 is configured with bits 12 and 22 set to modify the speaker gain in the second communications unit 130. The modification can be either to increase or decrease the gain of the speaker.

Figure 14:
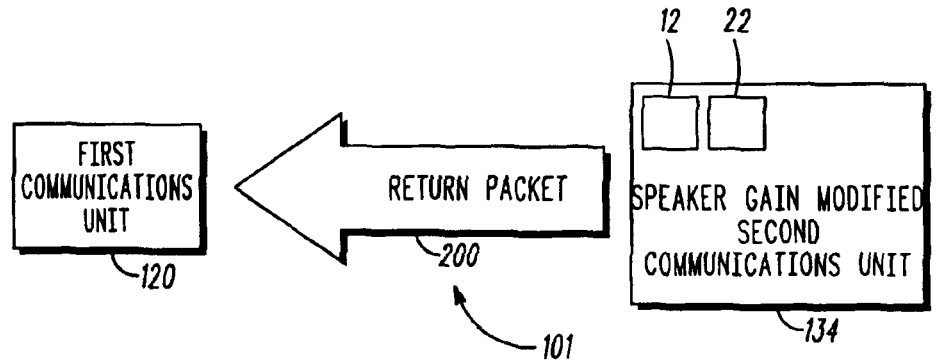
FIG. 14 is a block diagram illustrating transmission of a packet to a monitoring device from a monitored device reconfigured for adjusted speaker gain in accordance with one embodiment of the present invention.

FIG. 14 is a block diagram of wireless communication system 101 illustrating transmission of a return packet 200 from the speaker gain modified second communications unit 134 to the first communications unit 120, during stage S420 of FIG. 4 when the recipient speaks to the initiator. Upon receipt of the information modifier element 144 in FIG. 13, the second communications unit 130 is reconfigured in response to the embedded bits 12 and 22 forming a modified second communications unit 134 with a new speaker gain. By pushing the up scroll key 124 or the down scroll key 123 on the first communications unit 120, the monitored increases or decreases the gain on the speaker of the second communications unit 130.

Figure 15:
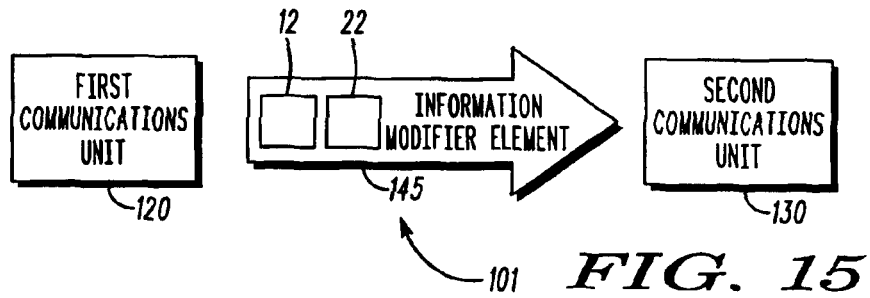
FIG. 15 is a block diagram illustrating transmission of a microphone gain modifying packet from a monitoring device to a monitored device in accordance with one embodiment of the present invention.

FIG. 15 illustrates a block diagram of wireless communication system 101 during transmission of an information modifier element 145 from a first communications unit 120 to a second communications unit 130. The information modifier element 145 is configured with bits 12 and 22 set to modify the microphone gain in the second communications unit 130. The modification can be either to increase or decrease the gain of the microphone. By pushing the push-to-listen button 122 and the up scroll key 124 or the down scroll key 123, on the first communications unit 120, the monitored increases or decreases the gain on the microphone of the second communications unit 130.

Figure 16:
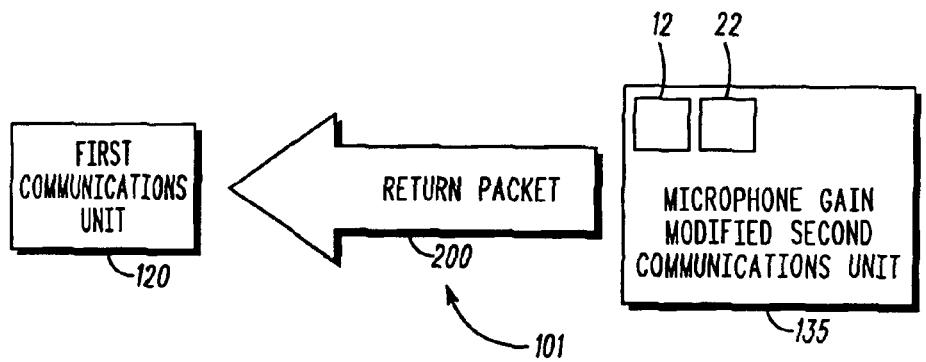
FIG. 16 is a block diagram illustrating transmission of a packet to a monitoring device from a monitored device reconfigured for adjusted microphone gain in accordance with one embodiment of the present invention.

FIG. 16 is a block diagram of wireless communication system 101 illustrating transmission of a return packet 200 from the microphone gain modified second communications unit 135 to the first communications unit 120 during stage S420 of FIG. 4 when the recipient speaks to the initiator. Upon receipt of the information modifier element 145 in FIG. 15, the second communications unit 130 is reconfigured in response to the embedded bits 12 and 22 forming a modified second communications unit 134 with a new mircrophone gain.

All the modifications described in FIGS. 9–16 are initiated by at least one key stroke upon at least one button on the first communications unit 120. All the push-to-listen modifications to the second communications unit 130 may be reset upon termination of the phone call to the default positions or at any other suitable time. The push-to-listen wireless communication system 101 described herein is capable of operation with a security authentication. A mode selection is available for a private monitoring/monitored phone book for push-to-listen or a private phone book for push-to-talk.

Figure 17:
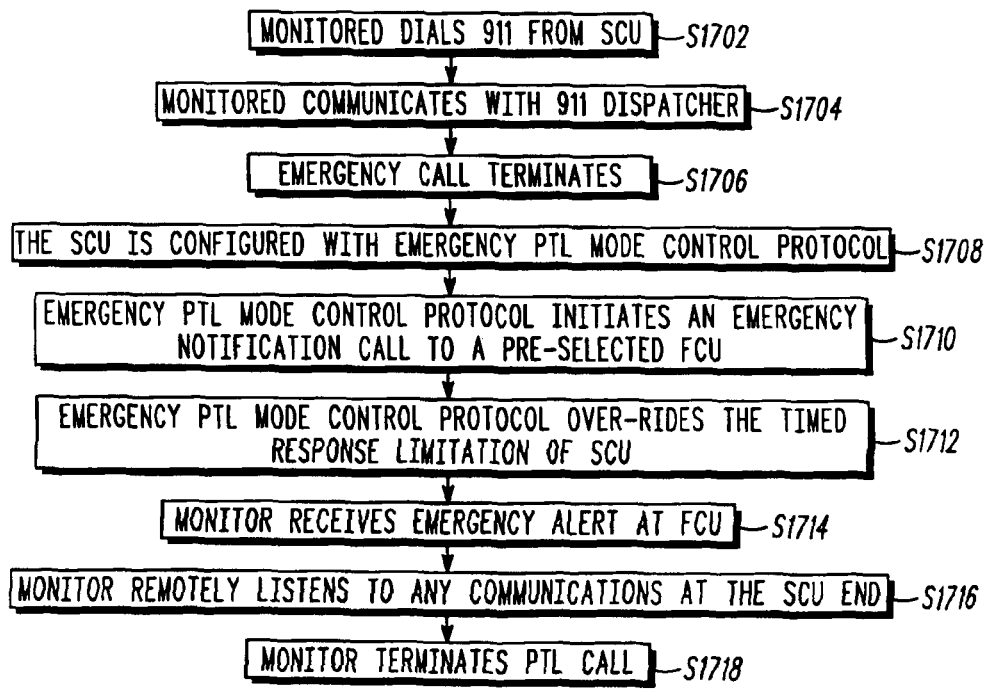
FIG. 17 is a flowchart representing operation of a second embodiment of the push-to-listen system of the present invention.

FIG. 17 illustrates how a monitored has the capability, in an emergency situation to of open a modified push-to-listen call with the monitor by dialing an emergency number. FIG. 17 illustrates flowchart 1700.

During stage S1702 the monitored dials 911, or another emergency number, from the second communications unit (SCU) 130. In one embodiment, the emergency number to bring emergency assistance to the monitored can be a number other than 911. In any case, the emergency number can be recognized by the emergency push-to-listen mode control protocol. During stage S1704, the monitor communicates with the dispatcher at 911. During stage S1706, the monitored or the emergency dispatcher terminates the emergency call.

During stage S1708, the second communications unit 130 is configured with an emergency push-to-listen (PTL) mode control protocol. The configuration of second communications unit 130 with an emergency push-to-listen mode control protocol is triggered by the termination of the emergency 911 during stage S1706.

During stage S1710, initiation of the emergency push-to-listen (PTL) mode control protocol triggers a push-to-listen call to a pre-programmed emergency contact at a first communications device (FCU) 120 from the second communications unit 130. This call is initiated without the monitored needing to push the push-to-listen button 122 on the second communications unit 120. The fixed network element 108 allocates a communication channel for the call.

During stage S1712, the emergency push-to-listen (PTL) mode control protocol overrides the timed response limitation of the second communications unit (SCU) 120. The timed response limitation is used during stage S420 in FIG. 4 during non-emergency situations. This override feature of the emergency push-to-listen mode control protocol maintains the one-way channel until the user of the first communications unit 120 terminates the call by pushing an abort button.

During stage S1714 the monitor receives an alert at the first communications unit (FCU) 120 that the monitored has dialed 911 and that a communication channel is open within the wireless system 107. In one embodiment, the alert is a distinctive emergency tone emitted by the first communications unit 120. During stage S1716, the monitor listens over the allocated channel to one way communication from the second communications device 130 to the first communications device 120. During stage S1718, the monitor terminates the push-to-listen (PTL) call by pushing an abort button. In one embodiment the abort button is the push-to-listen button 122. The monitor may terminate the call after the emergency personnel arrive and take the monitored to a medical care facility.

In another embodiment, a remote push to view capability may be added according to the teachings of U.S. patent application Ser. No. 10/427,069 filed on Apr. 30, 2003 and assigned to the assignee of this application. For monitoring, the first communications unit 120 will request a push-to-view and the second communications unit 130 will obtain an image and transmit it to the first communications unit 120. This is useful when the monitored does not respond to a push-to-listen call and a monitor desires to look at the monitored, or the area surrounding the second communications unit 130.

To ensure privacy, the present invention provides, in one embodiment, an option (entry field) on the phone book to select a push-to-listen/push-to-talk type call. The monitor stores a private identification number of other communication units in the phone book of the first communications unit 120. The private identification numbers are listed as push-to-talk, push-to-listen or both. When the initiator wants to generate a push-to-listen call, the push-to-listen field is selected at the first communications unit 120.

Once the fixed network element 108 allocates a communication channel for the call, the wireless system 107 begins the security authentication protocol. The security authentication protocol will only transmit push-to-listen calls for numbers in the push-to-listen phone book of the first communications unit 120. To be able to accept a push-to-listen call, the second communications unit 130 must have the private identification number of the first communications unit 120 on the phone book as push-to-listen. The security authentication is established when the wireless system 107 recognizes that the private identification number of first communications unit 120 is in the push-to-listen entry field of the phone book of the second communications unit 130. This security authentication protocol ensures that an unauthorized person cannot call a recipient and listen to the area surrounding the second communications unit 130. The call will be accepted only after both communication units 120 and 130 are authenticated.

The illustrated embodiment of the wireless communication system 101 is meant to illustrate method, means and computer readable code to provide a remote monitoring system in which a monitor and monitored can talk without the monitored pushing any buttons, and is not intended to be exhaustive of all possibilities or to limit what can be fabricated for the aforementioned purpose. There is therefore a multiplicity of other possible combinations and embodiments. By using what is shown and described herein, a method of communication is available to those who are incapable of pushing a button on a telephone. Those having ordinary skill in the art will therefore appreciate the benefit of employing an embodiment of wireless communication system 101 in numerous and various systems.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

We claim:

1. A method of operating a wireless communication system, the method comprising:
   initiating a call from a first communications unit to a second communications unit;
   embedding a push-to-listen control protocol configuration in a data packet responsive to the call initiation;
   transmitting the data packet from the first communications unit to the second communications unit; and
   configuring the second communications unit based on the push-to-listen control protocol configuration.

2. The method of claim 1, further comprising:
   transmitting an automatic reconnect from the second communications unit to the first communications unit responsive to said configuring step.

3. The method of claim 1 further comprising:
   performing a security authorization.

4. The method of claim 3 wherein the step of performing a security authorization
   further comprises:
   comparing an incoming push-to-listen call with a list of authorized push-to-listen calls;
   initiating the call if the caller is on the list.

5. The method of claim 1, further comprising:
   embedding a timed response control protocol configuration in the data packet; and
   configuring the second communications unit based on the timed response control protocol configuration.

6. The method of claim 5 further comprising:
   adjusting the timed response control protocol configuration in at least one subsequent data packet during the call; and
   reconfiguring the second communications unit based on the timed response control protocol configuration.

7. The method of claim 1, further comprising:
   embedding an additional hang time control protocol configuration in the data packet; and
   configuring the second communications unit based on the additional hang time control protocol configuration.

8. The method of claim 7, further comprising:
   adjusting the additional hang time control protocol configuration in at least one subsequent data packet during the call; and
   reconfiguring the second communications unit based on the additional hang time control protocol configuration.

9. The method of claim 1, further comprising:
   embedding a gain control protocol configuration in the data packet; and
   configuring the second communications unit based on the gain control protocol configuration.

10. The method of claim 9, wherein the gain control protocol controls the gain of the microphone of the second communications unit.

11. The method of claim 9, wherein the gain control protocol controls the gain of the speaker of the second communications unit.

12. The method of claim 9, further comprising:
    adjusting the gain control protocol configuration in at least one subsequent data packet during the call; and
    reconfiguring the second communications unit based on the gain control protocol configuration.

13. The method of claim 12, wherein adjusting the gain control protocol configuration adjusts the gain of the microphone of the second communications unit.

14. The method of claim 12, wherein adjusting the gain control protocol configuration adjusts the gain of the speaker of the second communications unit.

15. A wireless communication system comprising:
   means to initiate a call from a first communications unit to a second communications unit;
   means to embed a push-to-listen mode control protocol configuration in a data packet responsive to the call initiation;
   means to transmit the data packet from the first communications unit to the second communications unit; and
   means to configure the second communications unit based on the push-to-listen mode control protocol configuration.

16. The system of claim 15, further comprising:
   means to transmit an automatic reconnect from the second communications unit to the first communications unit responsive to said configuring step.

17. The wireless communication system of claim 15, further comprising:
   means to embed an additional hang time control protocol configuration in the data packet; and
   means to configure the second communications unit based on the additional hang time control protocol configuration.

18. The wireless communication system of claim 16 further comprising:
   means to adjust the additional hang time control protocol configuration in at least one subsequent data packet during the call; and
   means to reconfigure the second communications unit based on the additional hang time control protocol configuration.

19. The wireless communication system of claim 15, further comprising:
   means to embed a timed response control protocol configuration in the data packet; and
   means to configure the second communications unit based on the timed response control protocol configuration.

20. The wireless communication system of claim 18 further comprising:
   means to adjust the timed response control protocol configuration in at least one subsequent data packet during the call; and
   means to reconfigure the second communications unit based on the timed response control protocol configuration.

21. The wireless communication system of claim 15 further comprising:
   means to embed a gain control protocol configuration in the data packet; and
   means to configure the second communications unit based on the gain control protocol configuration.

22. The wireless communication system of claim 20 further comprising:
   means to adjust the gain control protocol configuration in at least one subsequent data packet during the call; and
   means to reconfigure the second communications unit based on the gain control protocol configuration to increase the gain on the microphone of the second communications unit.

23. The wireless communication system of claim 20 further comprising:
   means to adjust the gain control protocol configuration in at least one subsequent data packet during the call; and
   means to reconfigure the second communications unit based on the gain control protocol configuration to increase the gain on the speaker of the second communications unit.

24. A computer usable medium storing a computer program comprising
   computer readable code for initiating a call from a first communications unit to a second communications unit;
   computer readable code for embedding a push-to-listen mode control protocol configuration in a data packet responsive to the call initiation;
   computer readable code for transmitting the data packet from the first communications unit to the second communications unit; and
   computer readable code for configuring the second communications unit based on the push-to-listen mode control protocol configuration.

25. The computer usable medium storing a computer program of claim 24, further comprising:
   computer readable code for transmitting an automatic reconnect from the second communications unit to the first communications unit responsive to the configuration of the second communications unit based on the push-to-listen mode control protocol configuration.

26. The computer usable medium storing a computer program of claim 24, further comprising:
   computer readable code for performing a security authorization.

27. The computer usable medium storing a computer program of claim 24, further comprising:
   computer readable code for embedding an additional hang time control protocol configuration in the data packet; and
   computer readable code for configuring the second communications unit based on the additional hang time control protocol configuration.

28. The computer usable medium storing a computer program of claim 27, further comprising:
   computer readable code for adjusting the additional hang time control protocol configuration in at least one subsequent data packet during the call; and
   computer readable code for reconfiguring the second communications unit based on the additional hang time control protocol configuration.

29. The computer usable medium storing a computer program of claim 24, further comprising:
   computer readable code for embedding a timed response control protocol configuration in the data packet; and
   computer readable code for configuring the second communications unit based on the timed response control protocol configuration.

30. The computer usable medium storing a computer program of claim 29, further comprising:
   computer readable code for adjusting the timed response control protocol configuration in at least one subsequent data packet during the call; and
   computer readable code for reconfiguring the second communications unit based on the timed response control protocol configuration.

31. The computer usable medium storing a computer program of claim 24, further comprising:
   computer readable code for embedding a gain control protocol configuration in the data packet; and
   computer readable code for configuring the second communications unit based on the gain control protocol configuration.

32. The computer usable medium storing a computer program of claim 31, further comprising:

computer readable code for adjusting the gain control protocol configuration in at least one subsequent data packet during the call; and computer readable code for reconfiguring the second communications unit based on the gain control protocol configuration to increase the gain on the speaker of the second communications unit.

33. The computer usable medium storing a computer program of claim 31, further comprising:

computer readable code for adjusting the gain control protocol configuration in at least one subsequent data packet during the call; and computer readable code for reconfiguring the second communications unit based on the gain control protocol configuration to increase the gain on the microphone of the second communications unit.

34. A method of operating a wireless communication system, the method comprising:

initiating an emergency call from a second communications unit to an emergency number;

terminating the emergency call;

configuring the second communications unit with an emergency push-to-listen mode control protocol; and initiating a call to a first communications unit responsive to the configuring the second communications unit with an emergency push-to-listen mode control protocol.

\* \* \* \* \*